INVENTOR.
Robert J. Jauch
Howard Somervell
BY Wilkinson, Huxley, Byron & Knight
ATTORNEYS Oct. 7, 1941.　　　R. J. JAUCH ET AL　　　2,258,497
AIR SEPARATOR
Filed July 15, 1939　　　10 Sheets-Sheet 7

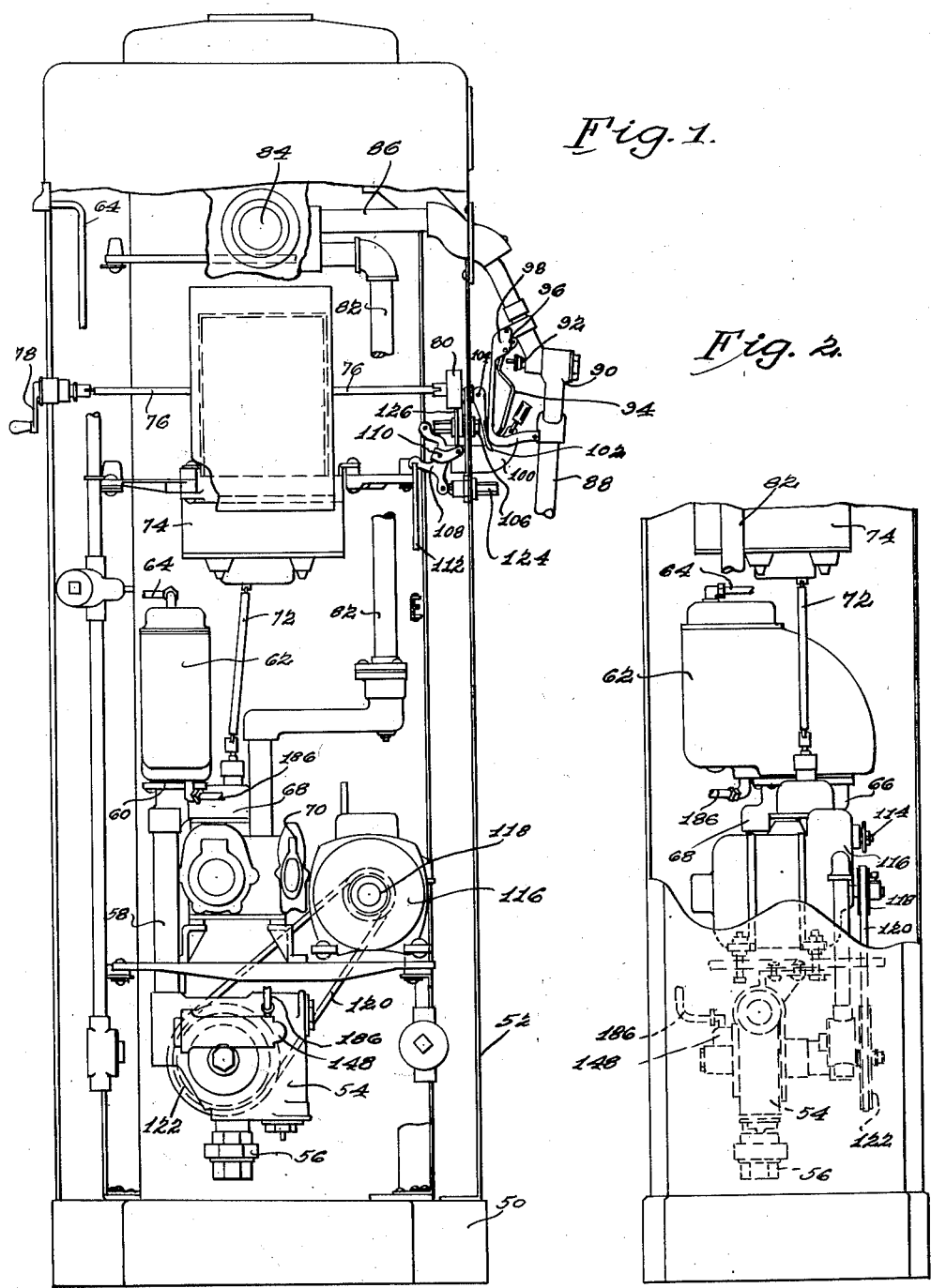

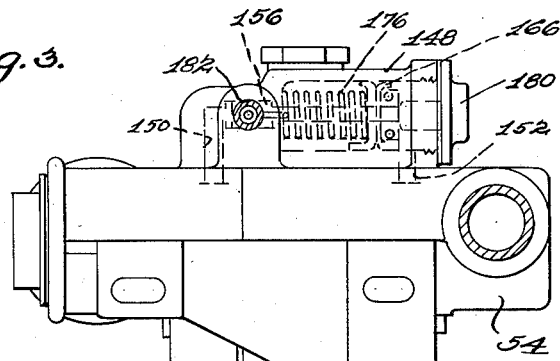
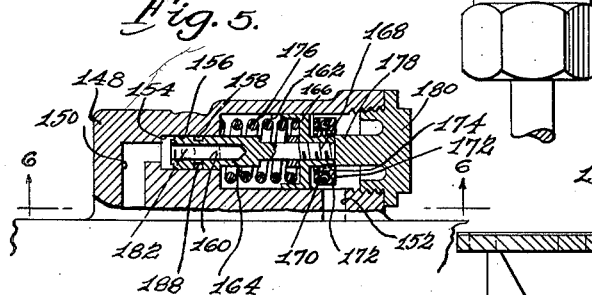
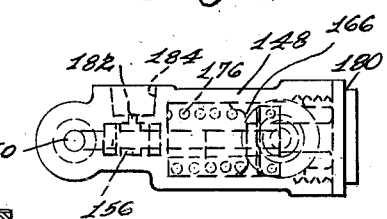
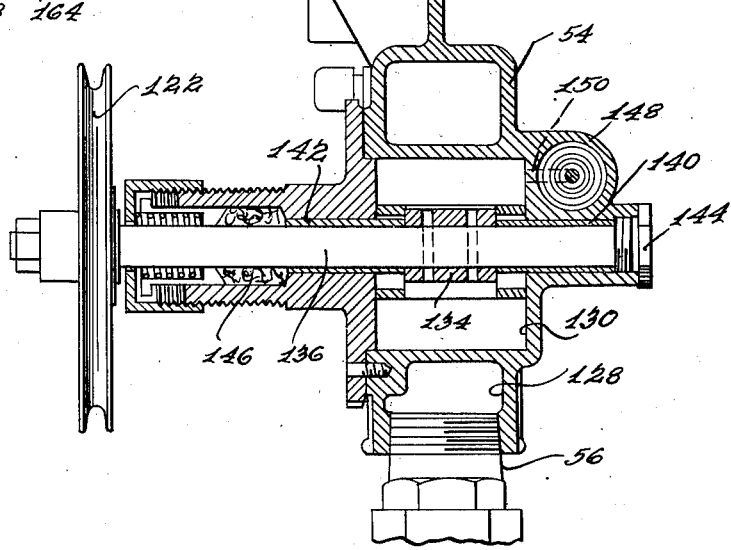

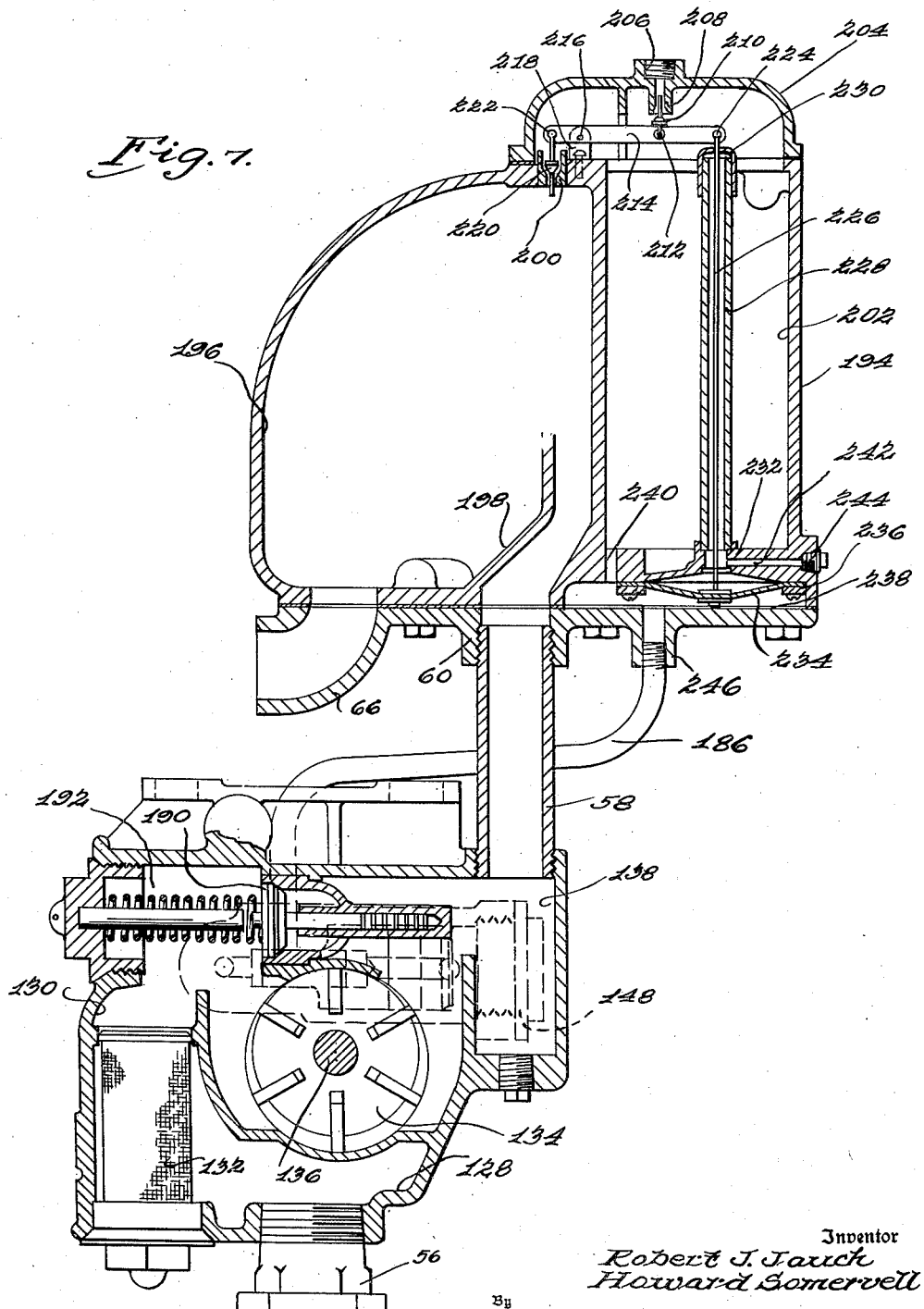

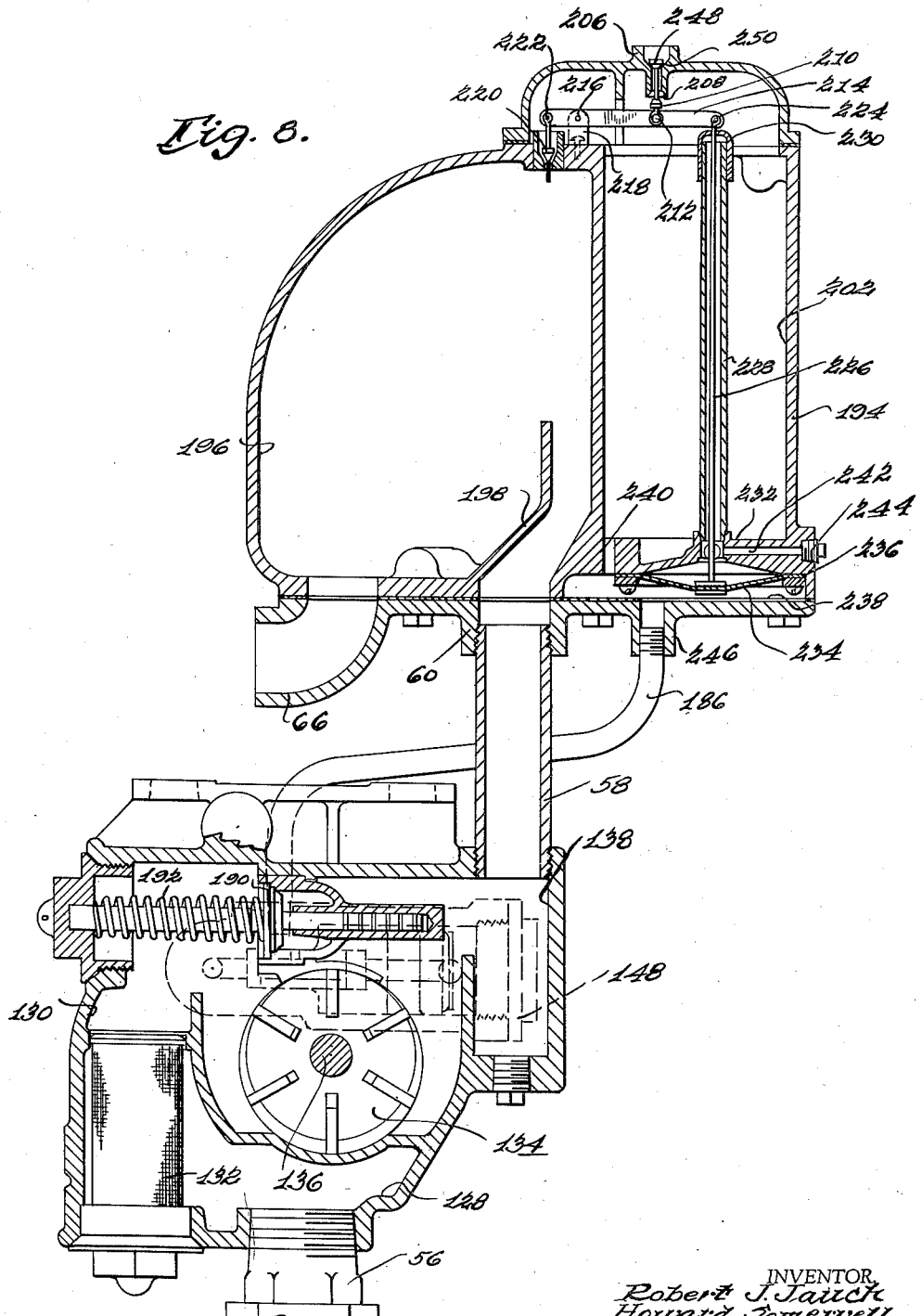

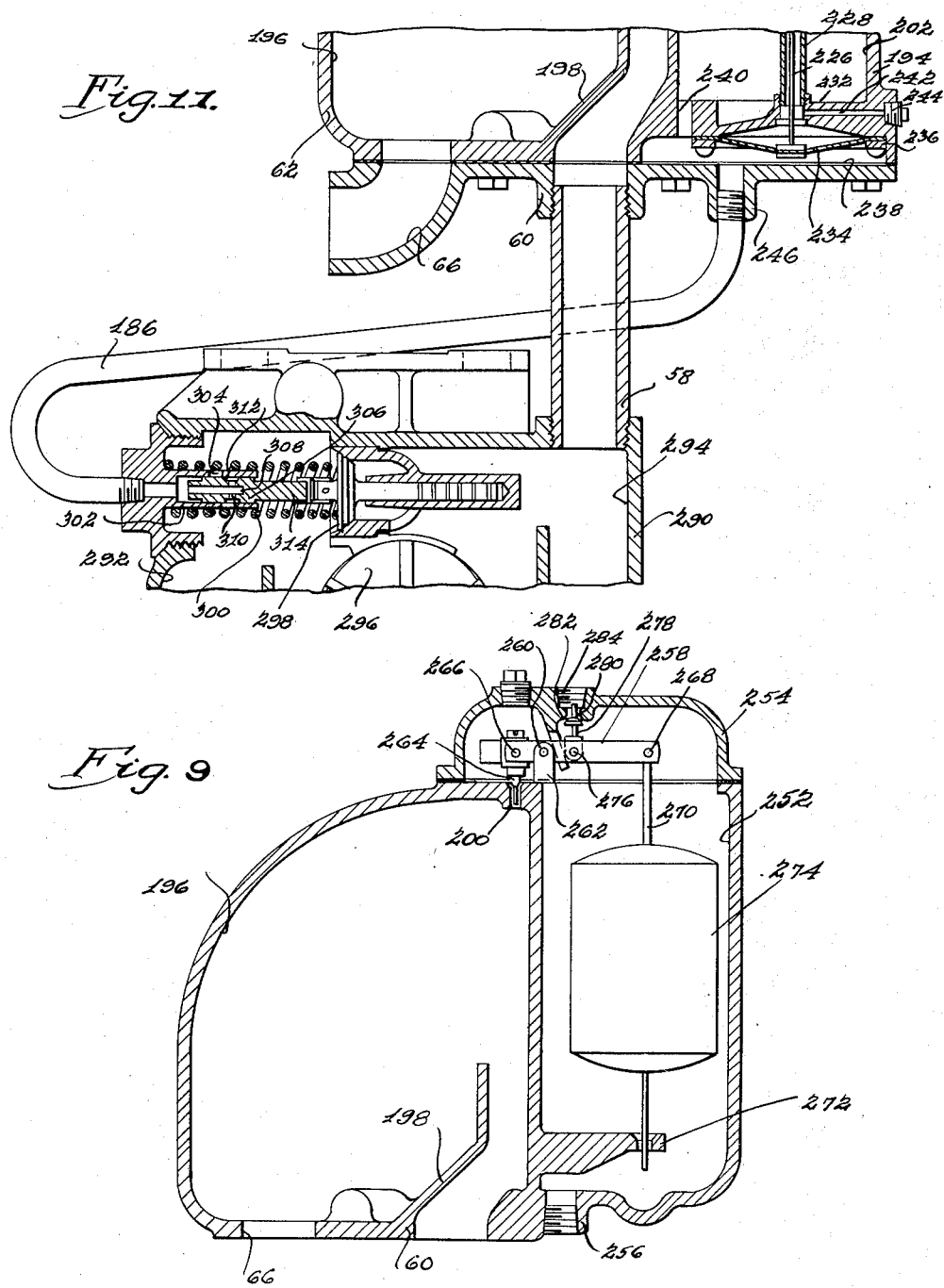

Inventor
Robert J. Jauch
Howard Somervel
By
Wilkinson, Huxley, Byron & Knight
Attorneys

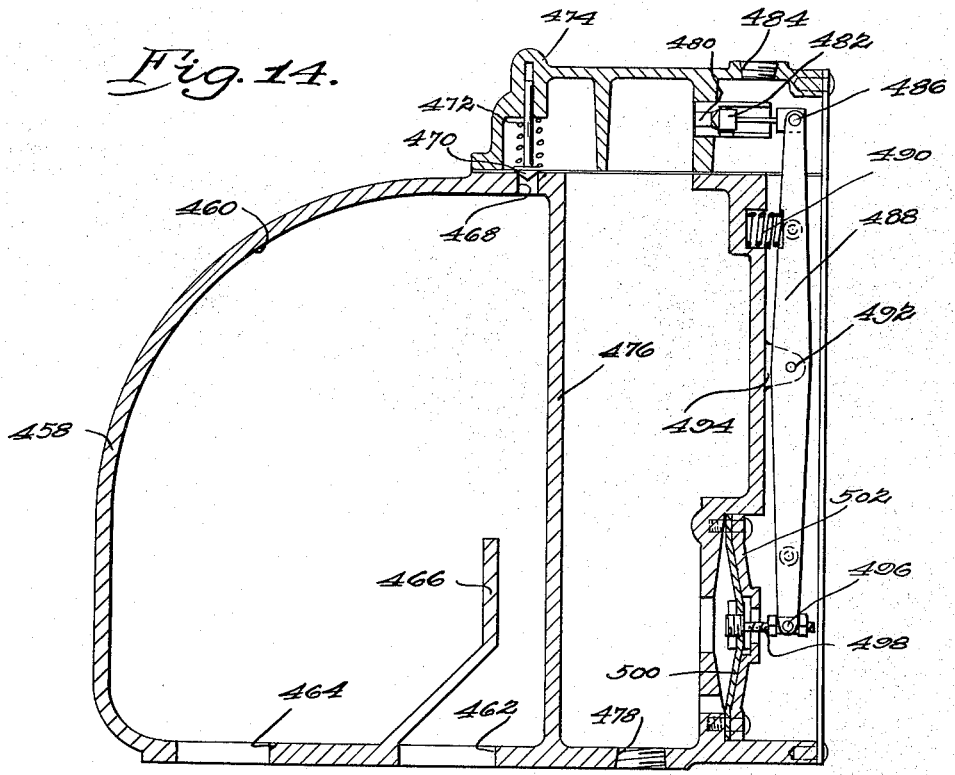
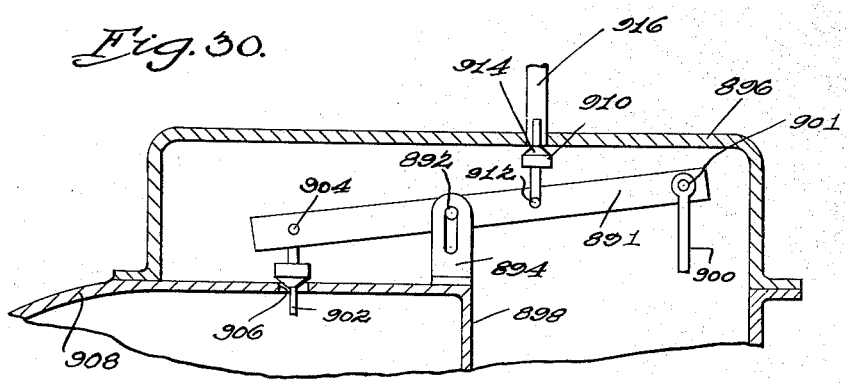

Oct. 7, 1941.  R. J. JAUCH ET AL  2,258,497
AIR SEPARATOR
Filed July 15, 1939  10 Sheets-Sheet 9
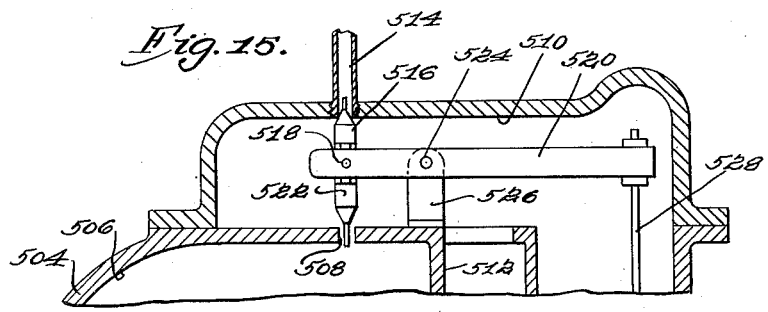
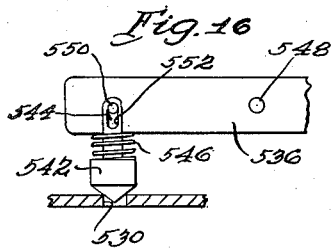 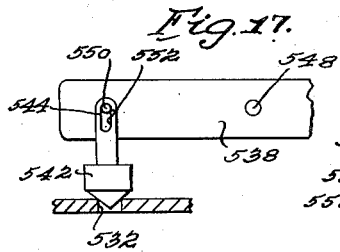 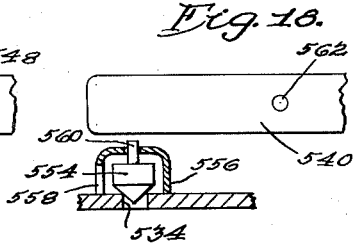
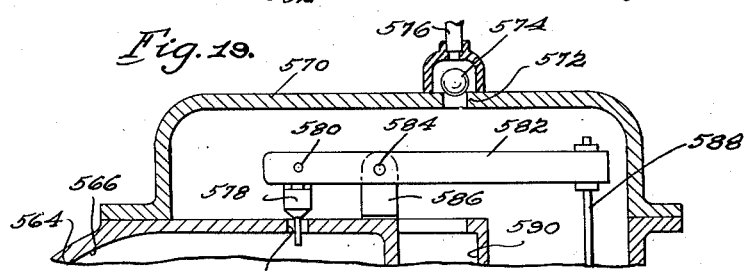
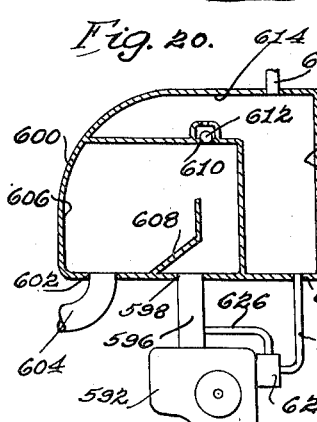 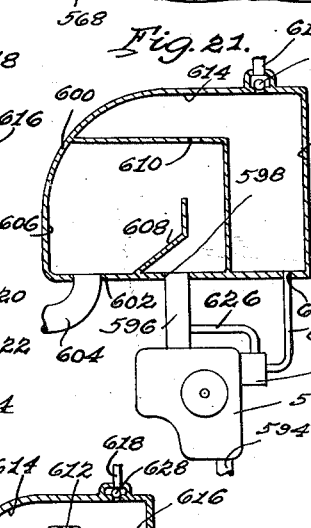 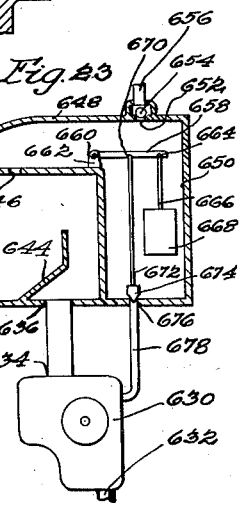
INVENTOR.
Robert J. Jauch
Howard Somervell
BY
Wilkinson Huxley Byron & Knight
ATTORNEYS

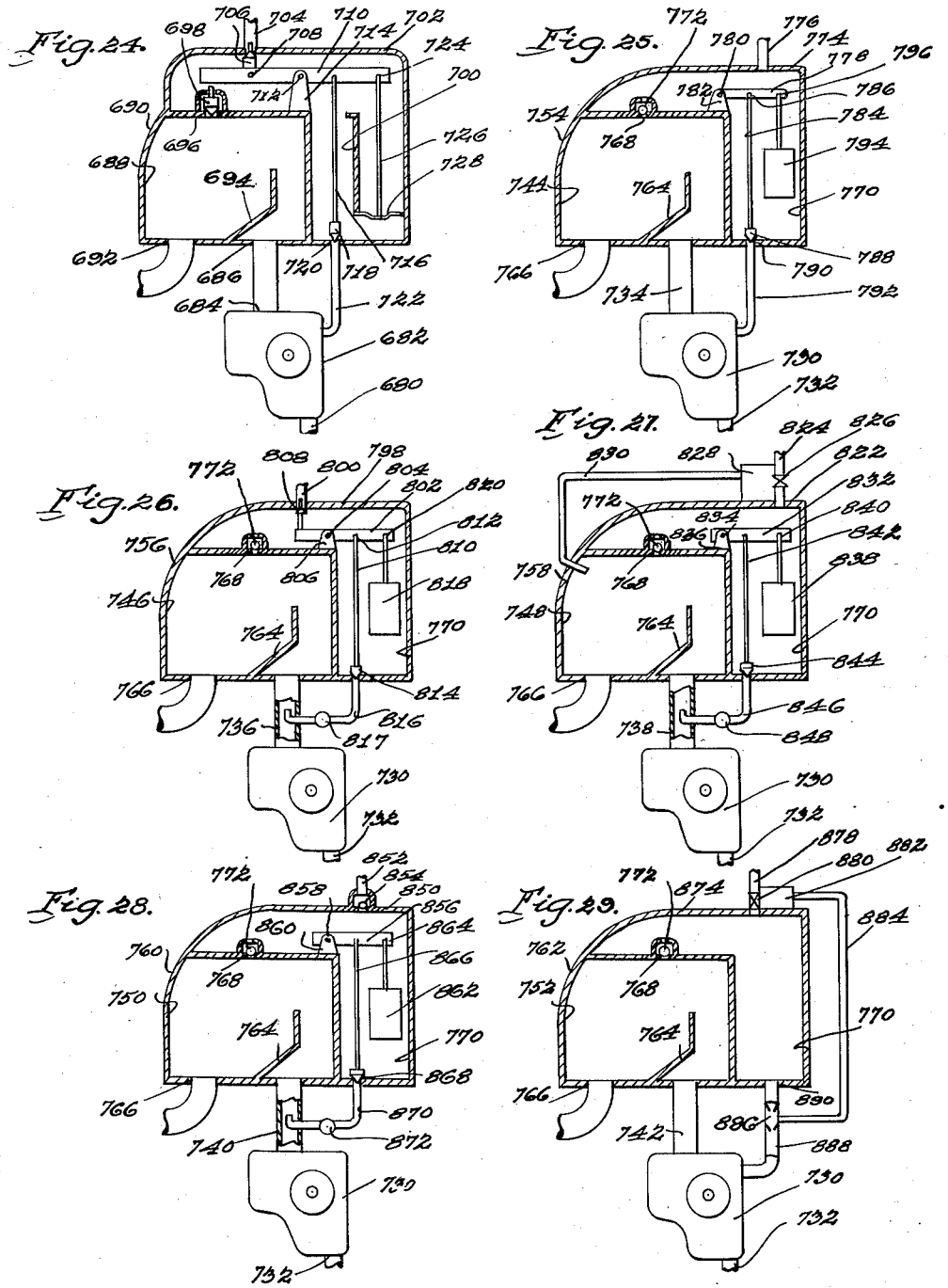

Patented Oct. 7, 1941

2,258,497

UNITED STATES PATENT OFFICE 2,258,497

AIR SEPARATOR

Robert J. Jauch, Fort Wayne, Ind., and Howard Somervell, Evanston, Ill., assignors to The Wayne Pump Company, Fort Wayne, Ind., a corporation of Maryland Application July 15, 1939, Serial No. 284,744

7 Claims. (Cl. 183—2.5)

This invention pertains to liquid dispensing apparatus and more particularly to air separation and recovery means therefor.

It is an object of this invention to provide a liquid dispensing apparatus having an air separator which is efficient in operation and wherein high and low pressure chambers are provided for separation and recovery purposes.

Another object is to provide air separating means which only operates to vent the separated air to atmosphere after a predetermined pressure is built up in the separator.

Yet another object is to provide air separating means and recovery means therefor which is only effective after the pump is pumping solid liquid.

Still another object is to provide means for positively removing recovered liquid from an air separator.

A further object is to provide air separating means which is so constructed and arranged that liquid cannot be ejected therefrom under any conditions.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is an elevation partly in section of a liquid dispensing apparatus embodying the invention;

Figure 2 is a fragmentary side elevation partly in section of the liquid dispensing apparatus illustrated in Figure 1, the same looking toward the left as viewed in said figure;

Figure 3 is an enlarged top plan view of the pump shown in Figure 2;

Figure 4 is an enlarged sectional elevation of the pump illustrated in Figure 3;

Figure 5 is an enlarged sectional top plan view taken through a pump control valve mechanism for the air separator;

Figure 6 is an enlarged sectional elevation taken substantially in the plane as indicated by the line 6—6 of Figure 5;

Figure 10:
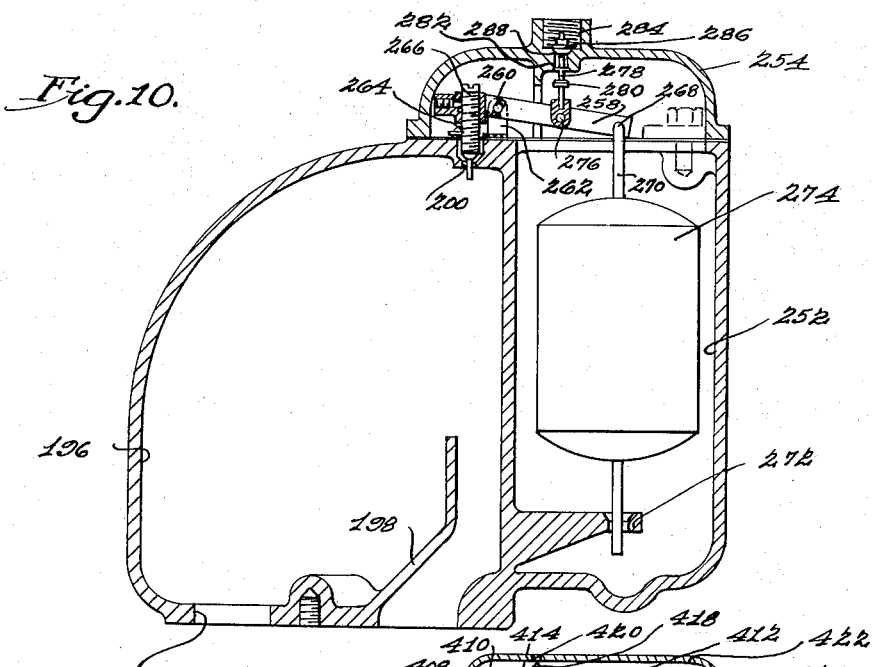

Figures 7, 8, 12, 13 and 20 to 29 inclusive, are sectional elevations through different forms of air separator and pump assemblies embodying the invention;

Figures 9, 10 and 14 are enlarged sectional elevations of different forms of air separators embodying the invention;

Figure 11 is an enlarged sectional elevation through a modified form of pump by-pass and return control for an air separator;

Figures 15, 19 and 30 are enlarged sectional elevations through an air separator showing different forms of vent control and restricted opening control means;

Figures 16, 17 and 18 are enlarged sectional elevations showing modified forms of valves for the vent control of an air separator.

In the liquid dispensing apparatus shown, the base 50 provides a support for the casing 52 within which the pump 54 is supported, said pump as shown being of the positive displacement rotary type provided with the inlet 56 adapted to be connected to a source of liquid supply (not shown). The outlet or pressure side of the pump is connected through the pipe 58 to the inlet 60 of the air separator indicated generally at 62, said air separator being provided with the vent 64 extending to and vented to atmosphere at a point high in the pump casing. The outlet 66 of the air separator is connected to the inlet side 68 of the meter 70 shown as of the positive displacement type. Said meter is provided with the meter shaft 72 adapted to be connected to, and to operate, a registering and computing mechanism 74 which may be as shown in Patent No. 2,151,239, Slye et al., granted March 21, 1939.

The register of said registering mechanism is adapted to be reset through the reset shaft 76 by means of the crank 78, an extension of said reset shaft being provided with the interlock mechanism 80 for preventing dispensing until the register has been reset to zero subsequent to each dispensing operation. The outlet side of the meter 70 is connected to the upwardly extending pipe 82 whereby liquid is supplied to the sight gauge 84 which may be of the type such as shown in Patent No. 2,157,087, Jauch et al., granted May 2, 1939. The outlet side of the sight gauge 84 is connected to the pipe 86 to which the hose 88 is connected. The opposite end of the hose is connected to the nozzle 90 controlled by the nozzle valve 92, said nozzle valve 92 being adapted to be operated by means of the lever 94 pivoted as at 96 within the guard 98. The guard 98 is adapted to provide a support for the nozzle on the fixed support 100, and when in supported position the nozzle and lever are so arranged that the nozzle valve cannot be operated.

When in inoperative position the nozzle is also supported so that the end thereof projects into a boot (not shown) whereby the end of the nozzle is not accessible until the nozzle is removed from its support. A guard lever 102 is pivoted on the casing as at 104 and is adapted to overlie the pushbutton 106 disposed above the fixed support; the pushbutton upon being moved inwardly by placing the nozzle on the hook, or manually, causing the bellcrank 108 to be moved in a counterclockwise direction about the pivot 110 to depress the switch rod 112, said rod being connected to the switch 114 of the motor 116 to move the switch to open position when the rod is depressed.

The motor is provided with the pulley 118 adapted to operate the pump 54 by movement of the belt 120 which also engages the pump pulley 122. The bell crank 108 is likewise adapted to be moved by the pushbutton 124 disposed below the fixed support. When the nozzle is removed from the support the pushbutton 124 may be moved inwardly to cause the bellcrank to be moved in a clockwise direction to close the switch, the bellcrank being connected to the interlock 80 as at 126 which prevents movement of the bellcrank to open the switch unless the register of the computing mechanism 74 has been reset to zero after each dispensing operation.

The pump 54, as has already been stated, is shown as a positive displacement pump and, as shown in Figures 3 to 8, is provided with the inlet chamber 128 in direct communication with the inlet 56. The inlet chamber 128 is in communication with the suction chamber 130 through the removable screen or filter 132, and a rotor 134 is provided on the operating shaft 136 on which the pulley 122 is disposed. The rotor 134 is disposed between the suction chamber 130 and the pressure chamber 138 which is in communication with the pipe 58. The shaft 136 is provided with the spread bearings 140 and 142 and the pump housing adjacent one end is closed as at 144, and the opposite end of the shaft passes through a suitable stuffing box 146 for attachment to the pulley 122.

In the construction shown in Figures 3 to 8 inclusive, the valve housing 148 is disposed on the pump housing and said valve housing is provided with the connection 150 to the pump suction. The valve housing also is provided with the connection 152 to the pump discharge. The connection 150 communicates with the valve recess 154 in which the sleeve valve 156 is slidably mounted, said sleeve valve being provided with the circular depression 158 and the axial channel 160, said channel communicating with the piston housing 162 through the ports 164 whereby the pump suction is in communication with one side of the piston 166. The piston 166 is connected to the sleeve valve stem as at 168 and is provided with the leathers 170 spring pressed as at 172, the springs being held by means of the retainer 174, said piston being normally urged toward the pump discharge by means of the spring 176, the stop 178 on the closure 180 limiting the movement of the piston. The piston thus is adapted to be acted upon by the pump pressure and the pump suction. The housing is provided with the aperture 182 which is in communication as at 184 with the return 186. The aperture 182 is adapted to connect the return 186 to the pump suction, through suitable radial apertures 188 disposed around the depressed portion 158 of the sleeve valve, the channel 160 and the connection 150. The pump is also provided with the by-pass valve 190 normally urged to closed position by means of the spring 192, said by-pass valve being adapted to open at a predetermined pressure to bypass the liquid within the pump casing. It is of course understood that the valve assembly shown in said Figures 3 to 6 inclusive, may be used with any form of air separator where such is desired for controlling the return of liquid from the recovery chamber.

The air separator 194 such as shown in Figure 7 consists essentially of the receiving or high pressure chamber 196 provided with the inlet 60 and the outlet 66, a suitable baffle 198 being disposed between said inlet and outlet for directing the liquid in a predetermined path. The chamber is provided with a restricted opening 200 adjacent the top thereof, said opening being in communication with the low pressure, float, or recovery chamber 202, said chamber being closed by means of the cap 204. The cap 204 is provided with the vent opening 206 for communication with the vent pipe 64, and said cap is provided with the valve seat 208 normally open to atmosphere and adapted to be closed by means of the valve 210 pivotally connected as at 212 to the lever 214. The lever 214 is pivoted as at 216 to a support 218 provided in the air separator, and a normally open valve 220 is pivoted to said lever as at 222. Said valve 220 is adapted to close the normally open restricted opening 200.

The opposite end of the lever 214 is pivotally connected as at 224 to the downwardly extending rod 226, said rod extending within the fixed tube 228 and being provided with the hood 230 embracing the upper part of the tube for preventing entry of fluid therein. The tube is fixed to the partition 232 disposed adjacent the lower end of the chamber 202. The diaphragm 234 is secured as at 236 to the partition 232, and is adapted to be acted upon by the liquid in the lower chamber 238 of the recovery chamber, said lower chamber communicating with the upper portion of the recovery chamber through the channel or opening 240. In order to drain any liquid trapped above the diaphragm, the drain channel 242 is provided in the partition 232 normally closed by means of the removable plug 244. The chamber 238 is also provided with the return outlet 246 connected to the return pipe 186.

In the operation of this form of device, when it is desired to dispense liquid, the nozzle 90 is removed from the support 100. Assuming the register to have been set to the zero position, the button 124 is moved inwardly, starting the motor. The motor will cause operation of the pump to supply liquid to the air separator, the liquid passing through the air separator, meter 70 and outwardly of the discharge line 82, the sight gauge 84, line 86, hose 88, and through the nozzle 90, it being assumed that the nozzle valve 92 is open. The liquid supplied to the high pressure chamber 196 of the air separator will receive a swirling motion, releasing any entrained air or vapor which will pass through the restricted opening 200 together with a small amount of liquid. The liquid entrained in the vapor will be deposited in the recovery chamber 202, and the liquid level will rise as the sleeve valve 156 will be closed so long as any air is being pumped. When the pump is pumping solid liquid, the suction acting on the left side of the piston 166, in addition to the pressure of the pump acting on the opposite side of said piston will cause the piston to be moved toward the left as viewed in Figure 5, which in turn will cause the depressed portion 158 and the apertures 164 to register with the opening 182, permitting liquid to be recovered from the recovery chamber to the suction side of the pump. After a predetermined amount of liquid is trapped in the recovery chamber, and in the event the liquid is not exhausted quickly enough, as for example, where there is a surge of liquid into the recovery chamber, the head acting on the diaphragm will cause upward movement of the rod 226 to close the valve 210, and the valve 220, thus preventing liquid from being ejected through the vent tube 64.

In the construction shown in Figure 8, the same numerals are used to show parts corresponding to those shown in Figure 7, and the valve 248 is provided for the valve seat 250 disposed in the connection 206, said valve being normally closed, but after a predetermined liquid level is reached in the recovery chamber 202, a slight upward movement of the rod 226 will cause the valve 248 to be lifted, permitting the vapor to be vented to the atmosphere, but the device is so arranged that the valve 210 is not normally closed, nor is the valve 220 normally closed. However, under the extraordinary conditions mentioned with respect to the construction illustrated in Figure 7, the valves 210 and 220 are closed, preventing liquid from being ejected to the atmosphere. The valve 248, being a normally closed valve, will prevent air from the atmosphere from being received into the pump should the sleeve valve be slow in closing after the recovery chamber has been drained of all liquid.

In the construction shown in Figures 9 and 10, modifications of Figures 7 and 8 respectively, are shown. In the construction shown in said figures, the pressure chamber 196 is provided with the baffle 198 separating the inlet 60 from the outlet 66, and said pressure chamber is provided with the restricted opening 200 communicating with the recovery chamber 252, said recovery chamber being closed by the dome 254 likewise extending over the restricted opening 200. The lower end of the recovery chamber is provided with the opening 256 (not shown, but provided in Figure 10) adapted to be connected to the return pipe 186. The lever 258 is pivoted as at 260 to the fixed support 262, and the valve 264 is provided pivoted to said lever as at 266, said valve 264 being similar to the valve 220 and being adapted to close the normally open restricted opening 200 under certain conditions to be later described. The opposite end of the lever 258 is pivoted as at 268 to the guide rod 270, the lower end of said guide rod being slidably received in the support 272, said guide rod being provided with the float 274. The lever 258 is pivotally connected as at 276 to the valve stem 278 provided with the normally open valve 280 controlling the valve seat 282.

In the construction shown in Figure 9, the opening adjacent the valve seat 282 is adapted to be connected as at 284 to the vent pipe 64.

In the construction shown in Figure 10 the valve stem 278 is also provided with the normally closed valve 286 disposed in the opening 284 connected to the vent 64 and adapted to seat on the valve seat 288.

The operation of the construction shown in Figures 9 and 10 is similar to the operations already described with respect to Figures 7 and 8, with the exception, however, that instead of depending upon a head of liquid to operate the valves 264, 280 and 286, the height of the liquid determines the operation of the float and consequently said valves.

In the construction shown in Figure 11, a modified form of sleeve valve for the pump is shown, it being understood, of course, that any form of air separator 62 such as described herein may be used, though the type of separator shown in Figure 7 is indicated. In this construction the pump 290 is similar to the pump 54, being provided with the suction chamber 292, the pressure chamber 294 connected to the pipe 58, the rotor 296, similar to the rotor 134, and the by-pass valve 298 similar to the by-pass valve 190, the by-pass valve being normally urged to closed position by means of the spring 300, similar to the spring 192. The return pipe 186 from the recovery chamber is connected to the cylinder 302, said cylinder being provided with the radial openings 304 closed by means of the sleeve valve 306 when the valve 298 is closed, said sleeve valve being provided with the axial channel 308 communicating through the radial openings 310 with the depression 312, said sleeve valve being provided with the valve stem 314 secured to the valve 298. The spring 300 is adjusted so that the by-pass valve 298 will not open until a predetermined pressure is built up and in normal dispensing operation the valve 298 will not open until the pump is pumping solid liquid, at which time the valve 298 will open, causing the depression 312 to register with the opening 304, thus connecting the return pipe 186 with the pump suction, permitting the liquid to be drained from the recovery chamber and the separator 62.

Figure 12:
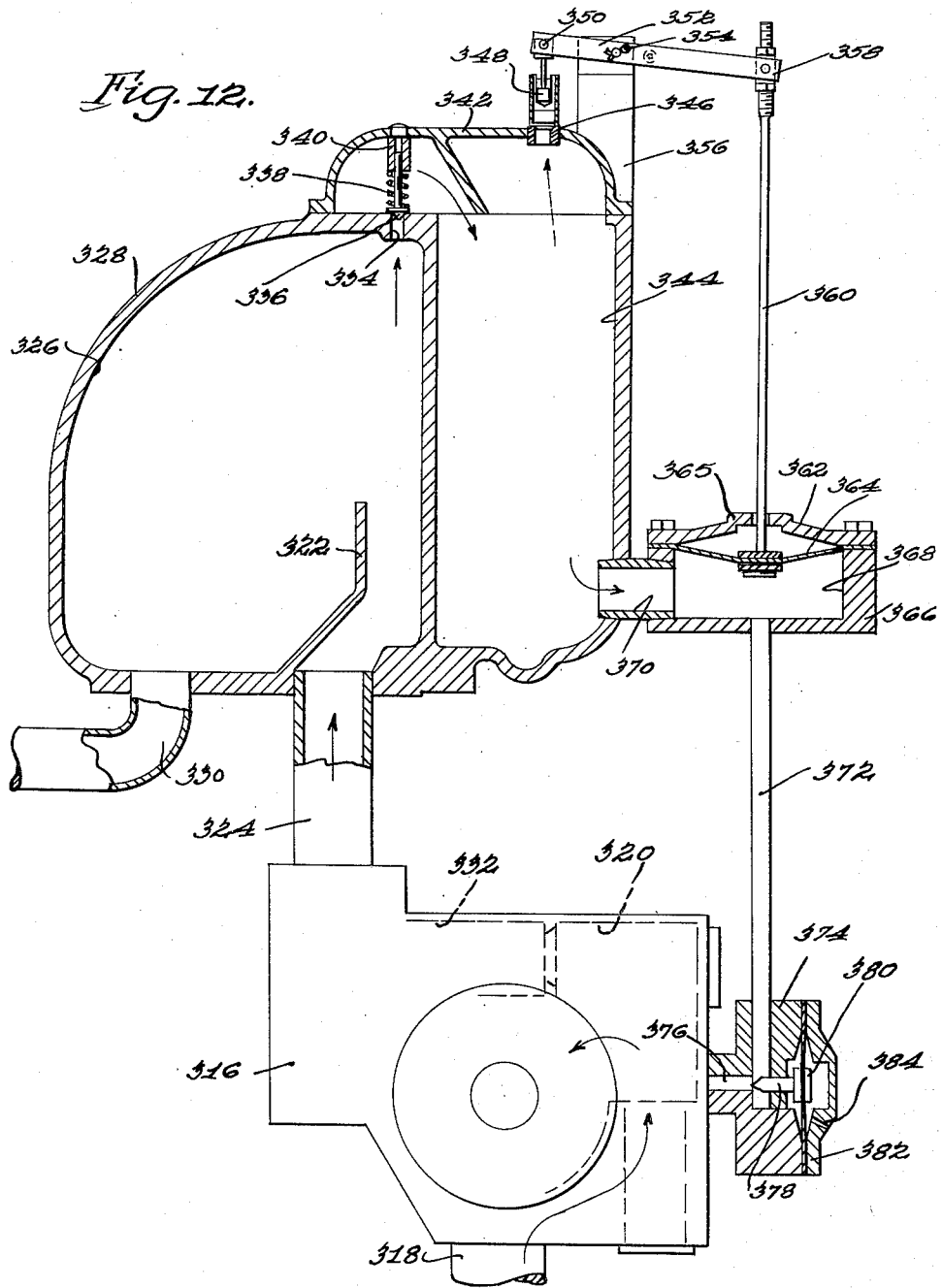

In the construction shown in Figure 12, the pump 316 is similar to the pump 54, being provided with the suction inlet 318, the suction chamber 320 and the pressure chamber 322 being separated by means of the by-pass valve (not shown). The outlet side of the pump is connected through the pipe 324 to the pressure chamber 326 of the separator 328, the outlet side of the pressure chamber being connected to the pipe 330 which in turn is connected to the meter. As before, the baffle 332 gives a predetermined direction to the liquid introduced into the pressure chamber, and said pressure chamber is provided with the restricted opening 334 normally closed by means of the valve 336, said valve being spring-pressed as at 338, guided by means of the member 340 provided in the dome 342.

The dome closes the recovery chamber 344 and is provided with the vent opening 346 connected in a manner (not shown) to the vent pipe 64. The opening 346 is adapted to be closed by the valve 348 pivotally connected as at 350 to the lever 352, said lever being pivoted as at 354 to the support 356. The opposite end of the lever 352 is pivotally connected as at 358 to the rod 360, the lower end of the rod extending into the housing 362 and being connected to the diaphragm 364, the diaphragm being secured between the cap 365 and the lower portion 366 of the housing 362 whereby a pressure chamber 368 is provided below the diaphragm 364, the chamber 368 being connected as at 370 to the lower portion of the recovery chamber 344. The chamber 368 is connected to the return pipe 372 which in turn is connected to the housing 374. The housing 374 is connected through the channel 376 to the suction chamber 320 and said channel 376 is closed by means of the valve 378 provided on the diaphragm 380 secured to the housing 374 by means of the head 382, a vent 384 being provided in said head.

In the operation of this form of the device, liquid is introduced under pressure to the pressure chamber 326 of the separator, and, after a predetermined pressure is built up, the vapor and a small amount of liquid will be forced past the valve 336 and liquid will be precipitated in the chamber 344, the vapor passing out of the opening 346 to the vent pipe. After a predetermined liquid head is obtained in the recovery chamber, the diaphragm 380 will open the valve 378 to permit recovery of the liquid from the recovery chamber. The liquid head in pipe 372 will act on the diaphragm either around the valve stem or through openings (not shown). However, after more than said predetermined amount of liquid is supplied to the recovery chamber, or if an abnormal amount of liquid is suddenly supplied to the recovery chamber, the diaphragm 364 will move the rod 360 upwardly, closing the valve 348, preventing ejecting of the liquid through the vent pipe 64. It is of course understood that this form of air separator may be used with the valve mechanism shown in Figures 3 to 6 inclusive.

Figure 13:
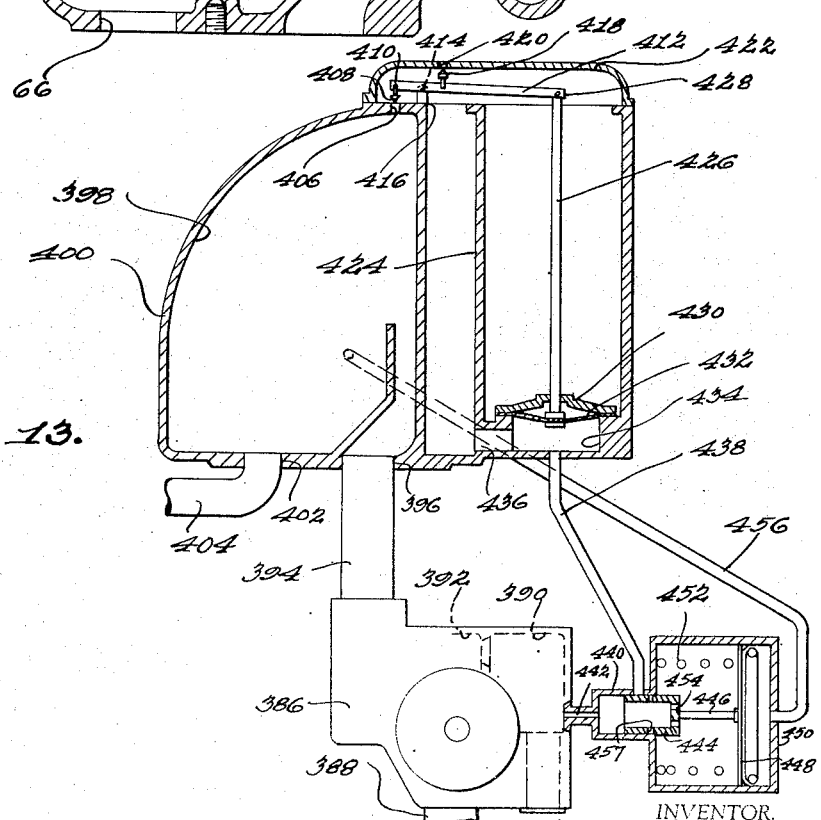

In the form of the device shown in Figure 13, the pump 386 is similar to the pump 54, being provided with the inlet 388 adapted to be connected to a source of liquid supply, and said pump is provided with a suction chamber 390 and a pressure chamber 392 separated by means of the by-pass valve (not shown). The outlet side of the pump is connected to the pipe 394 which is connected through the inlet 396 to the pressure chamber 398 of the air separator 400. The air separator 400 is provided with the outlet 402 connected to the pipe 404, which in turn is connected to the meter as already described. The pressure chamber 398 of the separator is provided with the restricted opening 406, and the normally open valve 408 controlling said opening is pivotally connected as at 410 to the lever 412. Said lever is pivotally connected as at 414 to the support 416, and said lever is provided with the valve 418 pivotally connected thereto and controlling the opening 420 in the dome 422. The dome 422 provides an upper closure for the recovery chamber 424. The rod 426 is pivotally connected as at 428 and extends downwardly through the cap 430 and is secured to the diaphragm 432. The recovery chamber 424 is connected through the opening 436 to the chamber 434 disposed below the diaphragm 432, the chamber 434 being connected to the return pipe 438. The return pipe 438 is connected to the cylinder 440 which in turn is connected as at 442 to the suction chamber 390, and the opening in said chamber 440 to which the pipe 438 is connected is controlled by means of the sleeve valve 444. The sleeve valve 444 is provided with the valve stem 446 connected to the piston 448 disposed in the cylinder 450. The piston 448 is normally urged toward the right as viewed in said figure by means of the spring 452, and said sleeve valve 444 is provided with the axial openings 454 forming communication to one side of the piston 448 with the pump suction. The opposite side of the piston is acted upon by pressure supplied to the pressure chamber 398 as the cylinder 450 is connected through the pipe 456 to the pressure chamber 398. The sleeve valve 444 is provided with the radial openings 457 adapted to connect the return 438 to the pump suction upon predetermined movement of the piston 448 toward the left as viewed in Figure 13.

In operation of this form of the device, when liquid is supplied to the pressure chamber 398, vapor will pass through the opening 406 and out through the opening 420 to the vent pipe. So long as the pump is pumping liquid having vapor therein it will not have sufficient pressure and suction to move the piston 448 toward the left as viewed in said figure so that the sleeve valve will remain closed and no communication will be established between the recovery chamber 424 and the pump suction. However, when the pump is pumping solid liquid, pressure in the pipe 456 in addition to the pump suction causes the piston 448 to open the sleeve valve, permitting liquid to be drained from the recovery chamber 424 and return pipe 438 to the pump suction. If there is an abnormal amount of liquid precipitated suddenly into the recovery chamber, a predetermined liquid head will cause the diaphragm 432 to move upwardly, closing the valves 418 and 408, preventing ejecting of the liquid to the atmosphere.

In the air separator construction illustrated in Figure 14, the air separator 458 is provided with the pressure chamber 460 having the inlet 462, and the outlet 464 separated by means of the baffle 466. The opening 468 is normally closed by means of the valve 470, the valve being urged toward closed position by means of the spring 472 interposed between the valve and the cap 474. The cap 474 closes the recovery chamber 476, the lower end of said recovery chamber being provided with the opening 478 adapted to be connected to a suitable valve arrangement as already described, which in turn is connected to the pump suction. The cap 474 is provided with the opening 480 controlled by means of the valve 482, and the opening 480 is thereby permitted to be connected to the opening 484, which in turn is connected to the vent. The valve 482 is pivotally connected as at 486 to the lever 488, the lever being normally urged in a clockwise direction by the spring 490 about the pivot 492 to open said valve. The lever 488 is pivotally connected at 492 to the support 494, and the opposite end of the lever is pivotally connected as at 496 to the rod 498 which in turn is connected to the diaphragm 500. The diaphragm 500 is adapted to be actuated by the head of liquid in the recovery chamber, and is secured in position by means of the cap 502. It will thus be seen that after a predetermined amount of liquid is supplied to the recovery chamber, the diaphragm will be moved toward the right, closing the valve 482 to prevent liquid from being ejected through the vent pipe. As before, liquid is supplied under pressure to the pressure chamber, and a small amount of liquid plus vapor is forced past the valve 470, the vapor passing through the openings 480 and 484 to the vent pipe, the liquid being precipitated in the recovery chamber to be returned to the pump suction in a manner already described.

Referring now to the construction illustrated in Figure 15, a modified form of valve control for the restricted opening and the vent tube is illustrated. This construction may be adapted to any of the form of separators illustrated herein. In this construction the air separator 504 is provided with a high pressure chamber 506 having a restricted opening 508 therein in communication with the dome 510 forming a closure for the recovery chamber 512. The dome is provided with the vent pipe 514 closed when the device is inoperative by means of the valve 516 pivotally connected as at 518 to the lever 520. The valve 522 for controlling the restricted opening is also pivoted at 518 to said lever, and said lever is pivotally connected as at 524 to the support 526. The lever is adapted to be controlled through the rod 528 which (as shown) may be controlled by the diaphragm such as shown in Figure 13, or to a float in the event a construction similar to that shown in Figure 9 is used. When liquid is pumped to the pressure chamber 506, vapor and a small amount of liquid passes through the opening 508, but the vapor cannot escape through the vent pipe 514 until a predetermined amount of liquid has been disposed in the recovery chamber 512, at which time the diaphragm (or float) moves the rod 528 a predetermined amount to open the valve 516 and permit the escape of vapor to atmosphere. In the event more than a predetermined amount of liquid is precipitated in the recovery chamber, the valve 508 will be closed until such time as liquid is exhausted by the pump.

In the construction shown in Figures 16, 17 and 18, forms of normally closed valves for the restricted openings 530, 532 and 534 are shown disposed adjacent the levers 536, 538 and 540, said levers being similar to the float or diaphragm controlled levers shown and described herein. In the construction illustrated in Figure 16, the valve 542 is loosely connected as at 544 to the lever 536, being urged toward normally closed position by means of the spring 546. The spring is of such character as to permit the passage of liquid, but when more than a predetermined amount of liquid is supplied to the recovery chamber, the lever 536 will be rotated about its pivot 548 to compress the spring and close the valve until such time as the liquid is exhausted.

The construction illustrated in Figure 17 shows the valve 542 loosely pivoted as at 544 to the lever 538, and urged toward normally closed position by its weight. The pin 550 forms the loose connection with the slot 552 (Figures 16 and 17), being adapted to force the valve to closed position upon movement of the lever 538 in a counter-clockwise direction about its pivot 548.

In the construction illustrated in Figure 18, the valve 554 is retained in the cage 556 opened about its periphery as at 558, but normally urged toward closed position by means of the weight of the valve. The valve stem 560 extends through the cage and is adapted to be contacted by the lever 540 upon pivotal movement about its pivot 562 to positively keep the valve in closed position when too much liquid is precipitated into the recovery chamber.

In the construction illustrated in Figure 19, the air separator 564 is provided with the pressure chamber 566 having the restricted opening 568. The opening 568 communicates with the dome 570 provided with the opening 572 controlled by the normally closed valve 574, said valve controlling the outlet of vapor to the vent pipe 576. The normally open valve 578 controls the opening 568, said valve being pivoted as at 580 to the lever 582, said lever being pivoted as at 584 to the support 586. Movement of the lever is controlled by the rod 588 which may be float or diaphragm controlled as described with respect to other modifications. The diaphragm or float moves the lever upwardly, depending upon the liquid head or level in the recovery chamber 590. Upward movement of the rod 588 serves to close the valve 578 until the head or level has fallen a predetermined amount.

In the constructions illustrated in Figures 20 to 22 inclusive, the pump 592 (not shown in Figure 22), similar to the pump 54, is adapted to have the suction side thereof connected as at 594 to the source of liquid supply (not shown). The outlet side of the pump is connected as at 596 to the inlet 598 of the air separator 600. The outlet 602 thereof is connected through suitable piping 604 to the meter. The inlet and outlet of said separator communicate with the pressure chamber 606 thereof, and said inlet and outlet are separated by means of the baffle 608. The pressure chamber is provided with the restricted opening 610, and in the constructions shown in Figures 20 and 22, said opening is normally closed by means of the caged valve 612 controlling flow of vapor into the dome 614 of the recovery chamber 616, the vent 618 being connected thereto. The recovery chamber 616 is provided with the outlet 620 connected to the pipe 622 which is connected to the valve means 624 which may be of the piston or diaphragm type of control wherein the valve is controlled through pump pressure through the pipe 626, the valve being of the same character, for example, as that shown in Figure 13. It is understood, of course, that said valve may be similar to that shown in Figures 3 to 6 inclusive.

The construction shown in Figure 21 differs from that shown in Figure 22 only in that the valve 612 controlling the restricted opening 610 has been omitted, but a normally closed valve 628 is provided in the constructions shown in Figures 21 and 22, controlling the outlet from the recovery chamber 616 to the vent 618.

The construction shown in Figure 22 may be said to set forth a combination of the features of Figures 20 and 21 wherein the valve 612 is provided controlling the opening 610 and also the valve 628 is provided controlling the outlet to the vent pipe 618.

In the construction illustrated in Figure 23, the pump 630 is adapted to be connected on its suction side as at 632 to a source of liquid supply (not shown). The outlet side of the pump is connected as at 634 to the inlet 636 of the pressure chamber 638 of the air separator 640. The outlet 642 of said separator is suitably connected to the meter. The inlet and outlet are separated by means of the baffle 644. The pressure chamber is provided with the restricted opening 646 connected to the dome 648 which in turn communicates with the recovery chamber 650. The dome is provided with the opening 652 normally closed by means of the valve 654 controlling flow of vapor to the vent 656. The lever 658 is pivotally connected as at 660 to the support 662, and is pivotally connected as at 664 to the rod 666 provided with the float 668. Said lever is also pivotally connected as at 670 to the valve stem 672 provided with the valve 674 for controlling the outlet 676 connected to the pipe 678, which in turn is connected to the pump suction.

In the operation of this form of the device, liquid is supplied to the pressure chamber, liquid and vapor passing out through the restricted opening 646. The float 668 maintains the valve 674 in closed position until a predetermined level is established, at which time liquid may be recovered by pump suction. Vapor passes outwardly of the vent pipe past the valve 654 which is adapted to open after a slight pressure is attained in the recovery chamber, thus permitting a more favorable precipitation of the liquid in the recovery chamber.

In the construction illustrated in Figure 24, the suction 680 of the pump 682 is connected to a suitable source of supply, the outlet side of the pump 684 being connected to the inlet 686 of the pressure chamber 688 of the air separator 690. The outlet 692 of the separator is separated from the inlet by means of the baffle 694 and is connected to a suitable meter. The pressure chamber is provided with the restricted opening 696 controlled by the caged valve 698 similar to that shown in Figure 18. The recovery chamber 700 is closed by means of the dome 702, said dome being provided with the vent 704, the vent being normally closed by means of the valve 706 pivotally connected as at 708 to the lever 710. The lever 710 is pivotally connected as at 712 to the support 714, said lever being provided with the valve stem 716 having the valve 718 thereon, said valve controlling the outlet 720 which in turn is connected through the pipe 722 to the pump suction. The lever 710 is pivotally connected as at 724 to the rod 726 adapted to be moved by the diaphragm 728 in a manner similar to that described with respect to Figures 7 and 13. It will thus be seen that liquid supplied to the pressure chamber permits the escape of vapor past the valve 698, a predetermined head causing the valve 706 to open to permit the escape of air to the atmosphere, the liquid level in the recovery chamber being controlled by the valve 718. Should an excess of liquid be supplied to the recovery chamber, the valve 698 will be closed by the diaphragm until the predetermined level is reached. It is understood, of course, that a float such as shown in Figure 9 may be used in place of the diaphragm.

In the constructions illustrated in Figures 25, 26, 27, 28 and 29, the pump 730 is connected to a source of liquid supply through the pipe 732. The outlet side of the pump is connected to the pipes 734, 736, 738, 740 and 742, which pipes are connected to the pressure chambers 744, 746, 748, 750 and 752 of the air separators 754, 756, 758, 760 and 762. The baffle 764 separates the inlets from the outlets 766, which in turn are connected to the meter. The pressure chambers are provided with the restricted openings 768 communicating with the recovery chambers 770, and as shown, the restricted openings are adapted to be controlled by the normally closed caged valves 772, though these valves may be omitted from the constructions illustrated in Figures 26 to 29 inclusive.

In the construction shown in Figure 25, the dome 774 is provided with the vent 776. The lever 778 is pivotally connected as at 780 to the support 782, and the valve stem 784 is pivotally connected as at 786 to said lever, said valve stem being provided with the valve 788 controlling the outlet 790, to which the pipe 792 is connected, which in turn is connected to the pump suction. The float 794 is pivotally connected as at 796 to the lever 778. When liquid is supplied to the pressure chamber 744, vapor will pass through the opening 768 and past the valve 772, and air will be exhausted through the vent 776. Liquid recovered in the recovery chamber will raise the float when a predetermined level is reached, permitting return of the liquid to reach the pump suction.

In the construction shown in Figure 26, the dome 798 is provided with the vent 800, and the lever 802 is pivotally connected at 804 to the support 806, said lever being provided with the valve 808 pivoted thereto, being normally closed but controlling the outlet to the vent. The valve stem 810 is connected as at 812 to the lever and is provided with the valve 814 controlling the flow through the pipe 816, said pipe extending into the pipe 736 and in the direction of the path of flow so that in effect a jet or ejector is provided causing the liquid to be drawn from the recovery chamber 770 after a predetermined level has raised the float 818 which is pivoted to the lever as at 820 to permit the return of solid liquid. Raising the float will open the valve 808 which is normally closed to permit exhaust of vapor through the vent 800. A one-way valve 817 may be provided in the pipe 816 to prevent liquid backing into the recovery chamber.

In the construction shown in Figure 27, the dome 822 is provided with the vent 824 controlled by the valve 826 which is normally closed, said valve being controlled by a suitable diaphragm or piston indicated generally as at 828 controlled by the pressure in the pressure chamber through the connection 830 to said pressure chamber. The lever 832 is pivotally connected as at 834 to the support 836. The float 838 is pivotally connected as at 840 to the lever, and the valve stem 842 is also pivoted to the lever, being provided with the valve 844 controlling the recovery line 846. The recovery line 846 is similar to the recovery line 816 opening in the direction of flow in the pipe 738, and a check valve or one-way valve 848 may be provided to prevent back flow of liquid into the recovery chamber under certain conditions.

In the construction shown in Figure 28, the dome 850 is provided with the vent 852 controlled by the normally closed valve 854, said valve being adapted to lift after a predetermined pressure has been built up in the recovery chamber. The lever 856 is pivotally connected as at 858 to the support 860. The float 862 is pivotally connected as at 864 to said lever 856, and the valve stem 866 is likewise pivotally connected thereto and provided with the valve 868 controlling the outlet from the recovery chamber to the pipe 870. Said pipe 870 is similar to the pipe 846 and may be provided with the check valve 872, and said pipe also opens in the direction of flow as already described.

In the construction shown in Figure 29, the dome 874 is provided with the vent 878, said vent being provided with the normally closed valve 880. Said valve 880 is controlled by a diaphragm or piston, indicated generally at 882, which is controlled by the suction through the pipe 884, said pipe being connected to the jet or ejector tube 886 provided on the recovery line 888 connected to the pump suction, or the pipe 884 may be connected directly to the pump suction, in which case the valve 882 is operated when the pump is pumping solid liquid. Said recovery line 888 is also connected to the outlet 890 of the recovery chamber 770.

In some instances where a valve is used to control the vent and also a valve is used to control the restricted opening, it may be desirable to have the valve controlling the restricted opening close in advance of the vent valve, in which case the beam 891, as shown in Figure 30, is loosely pivoted at 892 to the support 894 in the dome 896 of the recovery chamber 898. The beam is controlled by a float or diaphragm connected to the rod 900 pivoted at 901 to said beam. The beam is provided with the valve 902 pivoted thereto as at 904 for controlling the restricted opening 906 of the pressure chamber 908, and the valve 910 is pivoted to the beam at 912 and is adapted to control the opening 914 of the vent 916. Thus when a predetermined level is reached the upward movement of the rod 900 closes the valve 902, and continued movement causes the beam 891 to pivot about the connection 904 to close the valve 910. Thus the vapor is given time to escape after the supply from the pressure chamber is cut off and prior to the closing of the vent to prevent ejection of liquid through the vent tube.

It is to be understood that we do not wish to be limited by the exact embodiments of the device shown, which are merely by way of illustration and not limitation as various and other forms of the device will of course be apparent to those skilled in the art without departing from the spirit of the invention or the scope of the claims.

What is claimed is:

1. In a device of the character described, the combination of a pump having a suction and pressure side, an air separator having an inlet connected to the pressure side of said pump, said air separator having a recovery chamber having a vent, a flow connection, from said recovery chamber, a control valve mechanism for controlling flow from said connection to the pump suction, said valve mechanism including a housing having a cylinder therein, a piston in said cylinder, a connection from said cylinder on one side of said piston to the pressure side of said pump, a sleeve valve connected to said piston, said sleeve valve having a portion forming a communication between the suction side of said pump and the other side of said piston, said sleeve valve being adapted to close communication between said suction side of the pump and flow connection and having ported means movable to connect said flow connection and said suction side of the pump when the pump suction and pressure reaches a predetermined amount, and means urging said piston in one direction to move the valve to closed position.

2. In combination, a pump having a suction side and a pressure side, the inlet being on said suction side and being adapted to be connected to a source of liquid supply, the outlet being on the pressure side, an air separator having a main and secondary chamber, said main chamber having an inlet and an outlet, said last named inlet being connected to the outlet of said pump, a connection between said main and secondary chambers including a restricted opening, a valve in said secondary chamber for controlling said opening, means responsive to the amount of liquid in said secondary chamber for closing said valve after a predetermined amount of liquid is contained in said secondary chamber, a vent to the atmosphere from said secondary chamber, a valve controlling said vent, means for controlling discharge from said secondary chamber, said last named means including valve mechanism provided on said pump having a suction connection to the suction side of said pump, said valve mechanism including a valve for controlling said suction connection, means associated with said last named valve and in communication with the suction and pressure sides of said pump, said last named means being moved by the suction and pressure when the pump is pumping solid liquid to open said last named valve, and a connection between said suction connection and said secondary chamber for returning liquid to the suction side of said pump when said last named valve is open.

3. In combination, a pump having a suction side and a pressure side, the inlet being on the suction side and being adapted to be connected to a source of liquid supply, the outlet being on the pressure side, an air separator having a main and secondary chamber, said main chamber having an inlet and an outlet, said last named inlet being connected to the outlet of said pump, a connection between said main and secondary chambers including a restricted opening, a valve in said secondary chamber for controlling said opening, means responsive to the amount of liquid in said secondary chamber for closing said valve after a predetermined amount of liquid is contained in said secondary chamber, a vent to the atmosphere from said secondary chamber, a valve for controlling said vent, a return between said secondary chamber and the suction side of said pump, a valve controlling flow through said return, and means connected to said pump and last named valve and so constructed and arranged that it is movable when the pump is pumping solid liquid to open said last named valve to cause liquid to be returned from said secondary chamber to said suction side of said pump.

4. In combination, a pump having a suction side and a pressure side, the inlet being on the suction side and being adapted to be connected to a source of liquid supply, the outlet being on the pressure side, an air separator having a main and secondary chamber, said main chamber having an inlet and an outlet, said last named inlet being connected to the outlet of said pump, a connection between said main and secondary chambers including a restricted opening, a valve in said secondary chamber for controlling said opening, means responsive to the amount of liquid in said secondary chamber for closing said valve after a predetermined amount of liquid is contained in said secondary chamber, a vent to the atmosphere from said secondary chamber, a valve for controlling said vent, said valve being normally open and adapted to be controlled by said last named means, a return between said secondary chamber and the suction side of said pump, a valve controlling flow through said return, and means connected to said pump and last named valve and so constructed and arranged that it is movable when the pump is pumping solid liquid to open said last named valve to cause liquid to be returned from said secondary to said suction side of said pump.

5. In combination, a pump having a suction side and a pressure side, the inlet being on the suction side and being adapted to be connected to a source of liquid supply, the outlet being on the pressure side, an air separator having a main and secondary chamber, said main chamber having an inlet and an outlet, said last named inlet being connected to the outlet of said pump, a connection between said main and secondary chambers including a restricted opening, a valve in said secondary chamber for controlling said opening, means responsive to the amount of liquid in said secondary chamber for closing said valve after a predetermined amount of liquid is contained in said secondary chamber, a vent to the atmosphere from said secondary chamber, valves for controlling said vent, one of said valves being normally open, and the other being normally closed, said last named valves being controlled by said last named means, a return between said secondary chamber and the suction side of said pump, a valve controlling flow through said return, and means connected to said pump and last named valve and so constructed and arranged that it is movable when the pump is pumping solid liquid to open said last named valve to cause liquid to be returned from said secondary chamber to said suction side of said pump.

6. In combination, a pump having a suction side and a pressure side, the inlet being on the suction side and being adapted to be connected to a source of liquid supply, the outlet being on the pressure side, an air separator having a main and secondary chamber, said main chamber having an inlet and an outlet, said last named inlet being connected to the outlet of said pump, a connection between said main and secondary chambers including a restricted opening, a valve in said secondary chamber for controlling said opening, means responsive to the amount of liquid in said secondary chamber for closing said valve after a predetermined amount of liquid is contained in said secondary chamber, a vent to the atmosphere from said secondary chamber, a valve for controlling said vent, said valve being normally open and adapted to be controlled by said last named means, means for controlling discharge from said secondary chamber, said last named means including valve mechanism provided on said pump having a suction connection to the suction side of said pump, a valve for controlling said suction connection, means associated with said last named valve and in communication with the suction and pressure sides of said pump, said last named means being moved by the suction and pressure when the pump is pumping solid liquid to open said last named valve, and a connection between said suction connection and said secondary chamber for returning liquid to the suction side of said pump when said last named valve is open.

7. In combination, a pump having a suction side and a pressure side, the inlet being on the suction side and being adapted to be connected to a source of liquid supply, the outlet being on the pressure side, an air separator having a main and secondary chamber, said main chamber having an inlet and an outlet, said last named inlet being connected to the outlet of said pump, a connection between said main and secondary chambers including a restricted opening, a valve in said secondary chamber for controlling said opening, means responsive to the amount of liquid in said secondary chamber for closing said valve after a predetermined amount of liquid is contained in said secondary chamber, a vent to the atmosphere from said secondary chamber, valves for controlling said vent, one of said valves being normally open, and the other being normally closed, said last named valves being controlled by said last named means, means for controlling discharge from said secondary chamber, said last named means including valve mechanism provided on said pump having a suction connection to the suction side of said pump, a valve for controlling said suction connection, means associated with said last named valve and in communication with the suction and pressure sides of said pump, said last named means being moved by the suction and pressure when the pump is pumping solid liquid to open said last named valve, and a connection between said suction connection and said secondary chamber for returning liquid to the suction side of said pump when said last named valve is open.

ROBERT J. JAUCH.
HOWARD SOMERVELL.